United States Patent [19]

Cueman et al.

[11] Patent Number: 5,238,749

[45] Date of Patent: Aug. 24, 1993

[54] ANTIMICROBIAL COATING PROCESS AND PRODUCT

[75] Inventors: Glenn F. Cueman; Robert S. Watterson, III, both of Charlotte, N.C.

[73] Assignees: Clinitex Corporation, Huntersville; Avancer Technologies, Inc., Charlotte, both of N.C.

[21] Appl. No.: 669,165

[22] Filed: Mar. 14, 1991

Related U.S. Application Data

[63] Continuation-in-part of Ser. No. 286,515, Dec. 19, 1988, Pat. No. 5,000,979, which is a continuation-in-part of Ser. No. 845,095, Mar. 27, 1986, abandoned.

[51] Int. Cl.$^5$ .............................................. B32B 17/10
[52] U.S. Cl. ..................................... 428/441; 424/409; 424/411; 428/461; 428/500; 428/703; 428/907
[58] Field of Search ............... 428/907, 441, 461, 500, 428/703; 424/409, 411

[56] References Cited

U.S. PATENT DOCUMENTS 3,567,119  3/1971  Wilbert et al. ................. 424/411 X
3,575,123  4/1971  Shepherd et al. .............. 428/907 X
3,857,934  12/1974  Bernstein et al. ............. 424/411 X
4,098,877  7/1978  Ball et al. ......................... 424/45

Primary Examiner—Michael Lusigan
Attorney, Agent, or Firm—Ralph H. Dougherty

[57] ABSTRACT

An improved antimicrobial coated product and a method for coating substrates, the product of which is capable of withstanding high impact, is not subject to corrosion, is resistant to germ retention and transfer, and thus is extremely well suited for the containment of toxic, hazardous, corrosive, and bacteria-laden wastes as well as for products which are resistant to attack from fungus, positive and negative bacteria, yeast infections and contaminations, and viruses, as well as resistant to attack from corrosion, corrosive chemicals, caustic chemicals, and radiation. The substrate is coated with a thermoplastic material incorporating an antimicrobial agent by electrostatic, fluidized bed or flame spraying techniques. Alternatively, the substrate may be coated with a combination of a thermosetting resin and a thermoplastic material, either or both incorporating an antimicrobial agent, all of which can be cured in place.

8 Claims, No Drawings

ANTIMICROBIAL COATING PROCESS AND PRODUCT

CROSS REFERENCE TO RELATED APPLICATIONS

This application is a continuation-in-part of co-pending U.S. patent application Ser. No. 07/286,515, filed Dec. 19, 1988, now U.S. Pat. No. 5,000,979 which is a continuation-in-part of U.S. patent application Ser. No. 07/845,095, filed Mar. 27, 1986, abandoned.

FIELD OF THE INVENTION

The present invention relates to a coated product and a process for coating metallic and non-metallic substrates which can be used in a variety of products for use in hostile and bacteria-laden environments. The coated substrate not only has enhanced chemical and corrosion resistance, which provides a basis for use under a variety of harsh and/or hostile environments, but also has the capability of inhibiting the passage of and proliferation of germs.

BACKGROUND OF THE INVENTION

Several diseases can be transmitted from the carrier to another person merely by both parties contacting the same instrumentality before any steps can be taken to protect oneself. Some of these diseases are transmitted via the streptococci virus and the HIV, or AIDS virus. Such a common instrumentality is a flush handle or a wash basin faucet handle, both of which are commonly touched by the user before the user's hand can be washed.

Hospital personnel are especially at risk from readily transmitted diseases from handling bedpans and urinals, as well as other containers utilized for disposal of body waste and fluids. Food service personnel put both themselves and consumers at risk from various viruses, fungi, and disease-causing bacteria. In penal institutions, both employees and inmates can be at risk from all of the same items of possible cross contamination.

Eckner U.S. Pat. No. 4,481,239 teaches a process for coating metallic substrates, particularly pipes, wherein the substrate is preheated. A powder coating is electrostatically applied to the surface of the substrate and melted as a result of the high preheating temperature. The process uses one heat hardenable synthetic resin in combination with hardening agents and cross linkable acrylate resins, a stabilized ethylene copolymer, and optionally polyolefin. These are substantially different materials from those of the present invention, the Eckner materials being placed onto a basically steel substrate with the resulting coating substituting for standard pipe wrapping.

Point U.S. Pat. No. 3,513,012 teaches a process for coating an article with substances that are convertible into two continuous but separate solid layers. Electrically charged particles are electrostatically deposited on the first unconverted layer. Point also teaches that the particles are carried to a high electrical potential of about 100 kilovolts as they are discharged adjacent the substrate.

Antimicrobial materials have been utilized in the coating of outdoor furniture to prevent mildew, and similar anti-fungal paints have also been developed. However, until now, no one has developed a coated product or method for inhibiting transmittal of dangerous bacteria and viral microbes.

Anti-fouling paints for marine applications are known, but they do not actively prevent marine organisms from attaching themselves to various items beneath the surface of bodies of water.

We have invented a method for coating substrates, especially metallic substrates, which results in a coated product that is capable of withstanding high impact, is not subject to corrosion, is resistant to germ retention and transfer, and thus is extremely well suited for the use in high bacteria environments. The substrate in the present invention is coated with a combination of a thermoplastic material incorporating an antimicrobial agent, which are cured in place. Alternatively, the substrate is coated with a combination of a thermosetting material and a thermoplastic material, either or both of which incorporate an antimicrobial agent, and which coatings are separately or simultaneously cured in place. The invention also comprehends products resistant to attack from fungus, positive and negative bacteria, yeast infections and contaminations, and viruses, as well as resistant to attack from corrosion, corrosive chemicals, caustic chemicals, and radiation.

SUMMARY OF THE INVENTION

The invention is a process for coating a metallic or nonmetallic substrate, including the steps of: selecting a substrate that will hold an electrostatic charge; cleaning the surface of the substrate; grounding the substrate; electro-statically applying a layer of charged thermoplastic material containing an effective amount of an antimicrobial biocidal or biostatic substance to the substrate by electrostatic means; heating the substrate and coating to a temperature of from 355° to 430° F., preferably from 360 to 420 F., and holding the heat at that temperature for a period of from 5 to 22 minutes, resulting in the coating becoming tightly bonded to the substrate and molecularly cross-linked, whereby they develop outstanding resistance to permeability. The thermoplastic material is a resin selected from the group consisting of nylon 6, nylon 6—6, nylon 11, polyvinylidene fluoride polymer, and the polyethylene family of thermoplastic resins (polyethylene, polypropylene, polybutylene, etc.) and includes an effective amount of an antimicrobial biocidal or biostatic material, such as a chlorinated phenol.

When a dual layer coating is desired, a thermosetting material is applied to the substrate first. The process steps in this case are: selecting a substrate that will hold an electrostatic charge; cleaning the surface of the substrate; grounding the substrate; incorporating an effective amount of an antimicrobial biocidal or biostatic substance into at least one of preselected uncured powdered thermosetting or thermoplastic materials; electrostatically applying a first coating of a negatively charged thermosetting resin to the substrate; applying a second layer of positively charged thermoplastic material containing an effective amount of an antimicrobial biocidal or biostatic substance to the coating of thermosetting material by electrostatic means; heating the substrate and coatings to a temperature of from 355° to 430° F., preferably from 360 to 420 F, and holding the heat at that temperature for a period of from 5 to 22 minutes, resulting in the first and second coatings becoming tightly bonded to the substrate and molecularly cross-linked, where by they develop outstanding resistance to permeability. The antimicrobial biocidal or biostatic substance can be incorporated into either or both of the preselected uncured powdered thermosetting or thermoplastic materials. The thermosetting resin is a finely divided thermosetting amine cured epoxy of the family diglycidyl ether of bisphenol-A.

By initially electrostatically bonding the powdered materials, uniform and complete coverage of all surfaces is assured. When the thermoset and thermoplastic materials are simultaneously cured in place, the properties of both are optimized. The thermoset bonds aggressively to the metallic substrate, while the thermoplastic provides superior abrasion, chemical and ultraviolet (U.V.) radiation resistance. Typically, it is very difficult to achieve good bonding between thermosets and thermoplastics without priming and other surface preparations between layers. The process of co-firing these powders allows superior fusion of the two materials, but the final coating retains the attributes of both, as they cross-link to form a non-porous polymer.

Another method of coating a substrate, particularly for marine applications includes preparing the substrate for coating by cleaning it, then flame spraying thermoplastic material and an effective amount of an antimicrobial biocidal or biostatic substance onto the substrate to form a coating thereon.

The invention also comprehends coated products with antimicrobial properties, including a faucet handle, toilet handle, door or cabinet handle, stall separator, toilet seat, bed pan, urinal, surgical instrument, instrument tray, waste container, body fluid container, grease trap, fry basket handle, dishwasher, utensil, utensil handles, counter tops, seats such as chair seats, benches and stools, and other food service, dental, medical, clinical, surgical, sick room, hospital, and personal products which come into contact with human beings, body parts, or body wastes.

OBJECTS OF THE INVENTION

The principal object of this invention to provide a process for the coating of substrates, including metallic substrates, to be used in making antimicrobial and anticorrosive products.

It is another object of this invention to provide a method for producing coated materials which are impermeable to toxic, corrosive, and hazardous materials.

It is another object of this invention to provide a method for producing a coated antimicrobial metallic or non-metallic substrate having high impact and abrasion resistance.

It is another object of this invention to provide a method for producing a coated antimicrobial metallic or non-metallic substrate having high resistance to bacteria transfer.

It is also an object to render metallic or non-metallic substrates antimicrobial using an electrostatic spray.

It is also an object to render metallic or non-metallic substrates antimicrobial by fluidized bed techniques.

It is also an object to render metallic or non-metallic substrates antimicrobial using a flame spray.

It is another object of this invention to provide a product resistant to attack from fungus, positive and negative bacteria, yeast infections and contaminations, and viruses, as well as resistant to attack from corrosion, corrosive chemicals, caustic chemicals, and radiation.

It is another object of this invention to provide a method for rendering boats, buoys, pilings and other marine articles resistant to deleterious marine life.

These and other objects will become more fully understood by reference to the following detailed description of the invention.

DETAILED DESCRIPTION

In the most basic form of the invention, a protective coating of a thermoplastic material containing an effective amount of an antimicrobial biocidal or biostatic substance is deposited onto a substrate, and the coating is cured, and thermally bonded to the substrate.

The thermoplastic material is a resin selected from the group consisting of nylon 6, nylon 6—6, nylon 11, polyvinylidene fluoride polymer, and the family of polyethylene thermoplastic resins. The preferred resin is nylon 11.

In an alternative form of the invented process, a protective coating of a thermoset polymeric material, preferably a thermosetting amine cured epoxy of the family diglycidyl ether of bisphenol-A, is deposited onto a metallic or non-metallic substrate. A second coating of thermoplastic material is then deposited onto the first coating, and the coatings are cured, thermally bonded to the substrate, and to each other. Either or both coatings contain an effective amount of an antimicrobial biocidal or biostatic substance, such as a chlorinated phenol. The second protective coating is bonded to the first to form a cross-linked laminate. The second layer of thermoplastic material, such as nylon 11, provides increased chemical and corrosion resistance, along with substantially increased abrasion resistance, and resistance to bacteria. An additional benefit is resistance to ultraviolet and nuclear radiation. Note that both the coating materials, aromatic amine cured epoxy and nylon 11, will withstand radiation to $10^8$ rads, and are resistant to chemicals having a broad range of pH (in the range of from 2 to 10 pH).

The antimicrobial biocidal or biostatic substance, which is non-toxic, and free of heavy metals, is preferably a chlorinated phenol, such as 5-chloro-2-(2.4 dichloro-phenoxy) phenol. An alternative antimicrobial agent is PHMB—polyhexamethylene biguanide hydrochloride. Other chemical compounds having known antimicrobial biocidal or biostatic tendencies may also be employed.

The antimicrobial agent is put into powder form and mixed with the thermoplastic or thermoset material or both. From 1 to 9 percent by weight of the total powder comprises the antimicrobial substance. Preferably the antimicrobial biocidal or biostatic substance is from 2 to 5.5 percent by weight of the thermoplastic and or thermoset powder into which it is incorporated. The antimicrobial agent will migrate through the polymer to the surface from the amorphous zones of the polymer until equilibrium of the agent's internal vapor pressure is reached. If the antimicrobial substance on the surface of the coating is removed by friction or other means, more antimicrobial agent will move to the surface until the agent's internal vapor pressure is once again at equilibrium. Normally, the antimicrobial agent will melt at 150° F. and lose its biocidal properties when heated above 300 degrees F. However, in the present invention, we have found that the antimicrobial agent loses none of its biocidal properties when heated above 300 F. The antimicrobial efficacy of the finished product was tested by the Kirby-Bauer Standard Antimicrobial Susceptibility Test in which, after a predetermined period of time, the zone of inhibition of the organism is measured in millimeters against a known (polyethylene film) control. The coating powder containing the antimicrobial agent was heated to 420 for 15 min in an oven. Unexpectedly, the antimicrobial agent remains effective even after heating at a temperature greater than 33 F.

In order to test the efficacy of the antimicrobial agent after extensive use of a product, a toilet flush handle coated in accordance with the invented process underwent the following test procedure. A commercially available liquid cleaner was sprayed onto the product, followed by frictional contact with a bristle brush, a water spray rinse, and drying by friction with terry cloth. This cycle of cleaning and drying was repeated at five minute intervals for 2000 cycles. The efficacy of the product was tested before beginning the procedure and at 500 cycle intervals. There was no discernable difference in antimicrobial efficacy of the product coating at the start or after 500, 1000, 1500, or 2000 cycles.

Suitable substrates are metallic or non-metallic solids capable of holding an electrostatic charge, and capable of remaining stable, both chemically and structurally, i.e., holding its shape, at a temperature of from 300 to 600F. Such substrates include non-ferrous and ferrous metals, glass, porcelain, refractory and other high silica materials, plastics and thermoplastics. Ferrous metals suited as substrates are iron and steel, including hot rolled steel, cold rolled steel, alloy steel, and stainless steel. For some applications, aluminum, titanium, titanium alloys, nickel, nickel alloys, molybdenum, manganese, copper alloys, tin, zinc, brass, bronze, or other metals or alloys may be preferable to iron or steel as substrates. If flame spraying techniques are utilized, the substrate may be non-metallic and non-conductive, i.e., concrete. Flame spraying techniques may also utilize a broad range of thermoplastics containing an antimicrobial substance.

The substrate must be clean of dirt and grease. For iron or steel, suitable cleaning means for the substrate include blasting, such as sand, shot or bead blasting, or etching. This can be followed by a phosphatizing process, if desired. Phosphatizing is the process of cleaning, etching, and bonding a phosphate to the surface of the metallic substrate to enhance the bonding of the coating materials. When the substrate is aluminum, it can be sand blasted or etched and anodized. When the thermoplastic material is a nylon, the primer can be a liquid nylon.

Following surface preparation, the substrate is grounded. Negatively charged particles of a thermosetting polymeric material are applied to the substrate by electrostatic powder coating at high voltage (60 to 100 kv). A second layer of a mixture of particulate thermoplastic material and antimicrobial agent is positively charged and applied over the thermoset material by means of electrostatic powder coating at a substantially lower voltage (10 to 50 kv). The dual coated substrate is then heated to raise the temperature of both the substrate and the coatings into the range of 360° to 420° F. and held for a period of from 5 to 22 minutes, preferably from 5 to 15 minutes.

The dual coating process is operated in the following manner:

After cleaning the substrate by shotblasting and/or phosphatizing, the epoxy is applied electrostatically with a negative polarity gun with a ground path between the negative polarity gun and the substrate. Then nylon 11 in powder form, mixed with antimicrobial agent in powder form, is applied to the same substrate with a positive polarity gun and without any ground connection between the positive polarity gun and the substrate. This takes advantage of the previous charge on the first applied coating. The negative charged powder is put on with a differential of 60 to 100 kv. The nylon/antimicrobial powder mixture is then applied at 10 to 50 kv, a substantially lower differential voltage.

A theory to which we subscribe, but do not wish to be held, is that the nylon, when put on at a high voltage, moves through the first coating, leaving gaps in the nylon on the outer surface, requiring an additional coating step, thus the requirement for the low voltage in the thermoplastic powder application step.

The only suitable thermosetting resins for this application are thermosetting amine cured epoxies of the family diglycidylether of bisphenol-A (DGEBA), which are available from Armstrong Division of Morton Thiokol Corporation as Armstrong E-42403-4N Powder Coating.

Suitable thermoplastic resins include nylon 6, nylon 6—6, nylon 11, polyvinylidene fluoride polymers, polyethylene, and other thermoplastic resins. Nylon 11 is particularly well suited as a preferred thermoplastic material, because it is resistant to both abrasion and deterioration under ultraviolet light, for the reason that it is a fully cross-linked material.

Nylon is a difficult material to bond. Exotic nylon primers are in common use to hold nylon onto substrates. These are typically liquid dispersion primers which contain nylon. This allows the nylon powder to bond to like material. The present process avoids the use of primers. However, unless the curing ranges are as taught herein, applicants's tightly adherent coating will not be obtained.

The preferred range of particle sizes (U.S. Standard screens) of the powdered thermoplastic, thermosetting, and antimicrobial materials are:
100% of the particles pass a 100 mesh screen,
at least 85% of the particles pass a 200 mesh screen, and
50 to 90% of the particles pass a 400 mesh screen.

Any type heating is suitable for the curing and bonding process, including induction, radiant, convective, electrical resistance and radio-frequency heating. Note that for non-metallic substrates, micro-wave heating may be suitable.

The preferred method for applying the protective layers of thermoset and thermoplastic polymeric materials is electrostatic powder coating. By this method, specially ground powders of the materials are electrostatically bound to a metallic substrate, initially. The electric charge attracts the coating particles onto the substrate in a uniform fashion covering all exposed surfaces including crevices. The electrostatic coating process results in a nearly uniform continuous layer of materials covering all exposed substrate surfaces, joints, and welds.

Similar results can be achieved using fluidized bed coating methods. The invention also comprehends applying either coat by electrostatic means and the other coat by fluidized bed means. Flame coating may be utilized with the thermoplastic material with the thermosetting material applied by electrostatic or fluidized bed means.

When coating a substrate by the fluidized bed method, sequentially: prepare a substrate for coating by cleaning it; activate a fluidized bed of powdered thermoplastic material and powdered antimicrobial agent which have been thoroughly mixed; place the substrate within the fluidized bed; coat the substrate thoroughly;

then heat the substrate and the powder coating to a temperature from 350° to 440° F., generally in an oven or other heating chamber, and hold the temperature for a period of about 5 to about 22 minutes. Advantageously, the substrate is preheated to a temperature of 300 to 450° F. before introduction to the fluidized bed.

Since the particle sizes are not uniform, it was expected that the particle distribution of the powders would be uneven when using the fluidized bed coating technique, however, the particle distribution was unexpectedly uniform and even.

By proper selection of powder composition and particle size, outstanding adhesion properties are developed, in addition to the achievement of superior resistance to corrosion and chemical attack.

An alternative method of coating and curing a substrate is known as dual firing. Again, one or both of the thermosetting or thermoplastic materials incorporate the antimicrobial agent. Thermosetting material in powder form is applied to the substrate, preferably by electrostatic application, and the coated substrate is then heated to a temperature in the range of 350 to 440° F., but preferably in the range of 360 to 420° F., and held at such temperatures for a period of from about 5 to 22 minutes, preferably about 8 to 15 minutes, and optimally about 10 minutes, creating a strong bond between the thermoset material and the metal substrate, and fusing the powder into a nonporous polymeric coating.

After the polymeric material is bonded onto the substrate, the epoxy-coated substrate is cleaned or otherwise prepared. A second coating consisting of a thermoplastic material, such as nylon-11, is then also deposited on the first by electrostatic coating procedures. A second heat curing procedure assures complete bonding to the first layer.

The second curing treatment is carried out at a temperature of from 350° F. to 385° F., and optimally at 363° F., and held for a period of from 5 to 22 minutes, preferably about 8 to 15 minutes, and optimally about 10 minutes.

The resulting coated substrate has two layers tightly bonded to each other as well as to the metal substrate.

When extremely acidic materials are to be contained, a polymer such as polyvinylidene fluoride can be utilized in place of nylon 11, which will result in improved long term stability. This polymer is also a thermoplastic material, although some forms of it require high curing temperatures, sometimes as high as 585° F.

The combination of a thermosetting material such as epoxy and a thermoplastic material such as nylon 11 has the synergistic result of enhancement of the properties of both materials. The inclusion of an antimicrobial agent enhances the life of a coating. It is believed that this occurs because the antimicrobial agent prohibits the presence or growth of bacteria on the product or the coating which might otherwise be subject to bacterial attack. Significantly increased resistance to chemical, mechanical, environmental, and nuclear as well as ultra violet radiation damage is also achieved. By properly electrostatically powder coating and heating the materials, the integrity of the resulting dual-bonded and coated substrate is greatly enhanced.

The present invention, by either co-firing or dual firing, results in a much more strongly adherent coating than has heretofore been available for T & H containers or antimicrobial articles. The resulting coated substrate has been thoroughly tested for coating adherence and for impact and corrosion resistance.

In another alternative method for coating a substrate, thermoplastic powder incorporating an effective amount of antimicrobial biocidal or biostatic substance is directed at the substrate by flame spraying, the powder being melted by the flame so that it will adhere to the substrate. Alternatively to incorporating the antimicrobial substance in the thermoplastic powder, just beyond the flame a second spray of antimicrobial powder may be directed to impact onto the thermoplastic material, whereby the antimicrobial substance is incorporated into the thermoplastic as it approaches the substrate. In either of these cases, from 1 to 10 percent by weight of the total powder comprises the antimicrobial substance. Preferably the antimicrobial biocidal or biostatic substance is from 2 to 8 percent by weight of the thermoplastic powder. When flame spraying is employed, preheating the substrate is optional. Curing of the coating is unnecessary.

Flame spraying is extremely useful for marine applications, since the antimicrobial agent is not water-soluble, and will not harm adjacent marine life, but will prevent growth of deleterious marine life such as barnacles, zebra mussels, etc., onto the coating, thus resulting in an anti-fouling coating. This is especially advantageous for boats, buoys, concrete pilings, metal pilings, drilling platforms, undersea pipelines, canal locks and gates, dams, hydroelectric dam intakes, penstocks, and the like.

The coating of this invention has superior antimicrobial qualities as well as superior qualities of appearance, adhesion, high temperature resistance, low temperature resistance, U. V. resistance, radiation stability, impact resistance, and abrasion resistance. It has high resistance to solvents, including both low pH and high pH chemicals, and ground water. The coating has outstanding adherence to the substrate during and subsequent to bending, and containers made from our coated substrate have low cost when compared to other commercially available hazardous waste container materials.

SUMMARY OF THE ACHIEVEMENT OF THE OBJECTS OF THE INVENTION

It is readily apparent that we have provided a process for the coating of metallic and non-metallic substrates, well suited for use in making containers for the disposal of waste products, including toxic waste, body waste and other hazardous wastes, which coated substrate has an ultra high resistance to corrosion and chemical attack, and can therefore be used in other applications where these qualities are desirable and useful. The process renders metallic substrates antimicrobial using an electrostatic spray, flame spray, or a fluidized bed. Products made by the invented process are uniquely suited for use in hostile and bacteria-laden environments, as they are resistant to attack from fungus, positive and negative bacteria, yeast infections and contaminations, and viruses, as well as resistant to attack from corrosion, corrosive chemicals, caustic chemicals, and radiation.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An antimicrobial laminated article, comprising:
   a substrate selected from the group consisting of nonferrous and ferrous metals, glass, porcelain, concrete, refractory and other high silica materials, plastics and thermoplastics;
   a coating of thermoplastic material containing an effective antimicrobial amount of 5-chloro-2,4 dichloro-phenoxy) phenol which exhibits controlled migration through said coating to said substrate surface when an imbalance of vapor pressure of said 5-chloro-2-(2,4-dichloro-phenoxy) phenol within said coating demands equalization;
   said coating material being bonded to said substrate, and having a high degree of impermeability.

2. An antimicrobial coated product according to claim 1, wherein said 5-chloro-2-(2,4 dichloro-phenoxy) phenol comprises from 1 to 10 percent by weight of the thermoplastic powder.

3. An antimicrobial anti-fouling coated article, comprising:
   a substrate;
   a coating of a thermoplastic material containing an effective antimicrobial amount of 5-chloro-2-(2,4 dichloro-phenoxy) phenol which exhibits controlled migration through said coating to said substrate surface when an imbalance of vapor pressure of said 5-chloro-2-(2,4 dichloro-phenoxy) phenol within said coating demands equalization;
   said coating being bonded to the substrate, and having a high degree of impermeability.

4. An antimicrobial anti-fouling coated article according to claim 3, said substrate being selected from the group consisting of: boats, buoys, concrete pilings, metal pilings, drilling platforms, undersea pipelines, canal locks and gates, dams, hydroelectric dam intakes, and penstocks.

5. An antimicrobial coated product made by the process of, sequentially:
   selecting a substrate that will hold an electrostatic charge;
   preparing the surface of the substrate;
   grounding the substrate;
   electrostatically applying a layer of a positively charged, uncured, powdered thermoplastic material containing an effective antimicrobial amount of an antimicrobial biocidal or biostatic substance which maintains its biocidal properties above 300° F. and migrates through the thermoplastic material to the surface of the thermoplastic on demand to said substrate by electrostatic methods;
   the antimicrobial biocidal or biostatic substance being selected from the group consisting of 5-chloro-2-(2,4dichlorophenoxy) phenol and polyhexamethylene biguanide hydrochloride which exhibits controlled migration through said coating to said substrate surface when an imbalance of vapor pressure of said 5-chloro-2-(2,4 dichloro-phenoxy) phenol within said coating demands equalization; and
   thereafter heating the substrate and said coating to a temperature of from 355° to 430° F. and holding the temperature for a period of from 5 to 22 minutes;
   whereby said coating materials become cured and bonded to the substrate, and develop a high degree of impermeability.

6. An antimicrobial coated product according to claim 5, wherein said antimicrobial biocidal or biostatic substance is from 1 to 10 percent by weight of the thermoplastic powder.

7. An antimicrobial product according to claim 5, wherein said substrate is a food service, dental, medical, clinical, surgical, sick room, hospital, or personal product which comes into contact with human beings, body parts, or body wastes.

8. An antimicrobial product according to claim 5, wherein said substrate is selected from the group consisting of: handle, stall separator, toilet seat, bed pan, urinal, surgical instrument, instrument tray, waste container, body fluid container, grease trap, basket, dishwasher, utensil, counter top, chair seat, bench and stool.

* * * * *

UNITED STATES PATENT AND TRADEMARK OFFICE
CERTIFICATE OF CORRECTION

PATENT NO.   :   5,238,749
DATED        :   August 24, 1993
INVENTOR(S)  :   Glenn F. Cueman; Robert S. Watterson, III It is certified that error appears in the above—identified patent and that said Letters Patent is hereby corrected as shown below:

Column 2, line 48, before "thermosetting", change "a" to -- the --

Column 5, line 4, change "33" to -- 330 --

Column 9, line 7, change "5-chloro-2,4 dichloro-phenoxy)" to
             -- 5-chloro-2-(2,4 dichloro-phenoxy) --

Column 10, line 8, change "F." to -- F --

Column 10, line 13, change "(2,4dichlorophenoxy)" to
             -- (2,4 dichloro-phenoxy) --

Signed and Sealed this

Seventh Day of June, 1994

Attest:

BRUCE LEHMAN

Attesting Officer          Commissioner of Patents and Trademarks